(12) United States Patent
Yang

(10) Patent No.: US 10,626,981 B2
(45) Date of Patent: Apr. 21, 2020

(54) GEAR SHIFT FOR AUTOMOTIVE TRANSMISSION

(71) Applicant: SL Corporation, Daegu (KR)

(72) Inventor: Jihoon Yang, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/506,627

(22) Filed: Jul. 9, 2019

(65) Prior Publication Data

US 2020/0080632 A1   Mar. 12, 2020

(30) Foreign Application Priority Data

Sep. 11, 2018 (KR) .................. 10-2018-0108243

(51) Int. Cl.
| | | |
|---|---|---|
| F16H 59/02 | (2006.01) |
| G05G 5/03 | (2008.04) |
| F16H 59/04 | (2006.01) |
| G05G 5/02 | (2006.01) |
| F16H 59/10 | (2006.01) |

(52) U.S. Cl.
CPC ....... F16H 59/0278 (2013.01); F16H 59/044 (2013.01); G05G 5/02 (2013.01); G05G 5/03 (2013.01); F16H 59/10 (2013.01)

(58) Field of Classification Search
CPC ............. F16H 59/0278; F16H 59/044; F16H 2059/026; F16H 2059/047; F16H 59/10; G05G 5/02; G05G 5/03; G05G 5/04
See application file for complete search history.

(56) References Cited

U.S. PATENT DOCUMENTS 10,288,165 B2 *  5/2019  Makimura .......... F16H 59/0204
2018/0283543 A1 * 10/2018  Cha ...................... F16H 61/22

* cited by examiner

*Primary Examiner* — Adam D Rogers
(74) *Attorney, Agent, or Firm* — Nelson Mullins Riley & Scarborough LLP; Kongsik Kim, Esq.

(57) ABSTRACT

A gear shift that allows for shift operation is provided. The gear shift includes a rotating part coupled with a knob operated by a driver and configured to rotate about a rotation axis to allow one of a plurality of modes of operation to be selected; a contact part disposed at one side of the rotating part to be rotated integrally with the rotating part; a detent mechanism disposed on a rotation path of the contact part to allow an end portion of the contact part to be in contact therewith; and a moving part configured to move to be disposed between the contact part and the detent mechanism when a moving condition is satisfied, to cause the contact part to move from a position that corresponds to one of the plurality of modes to a position that corresponds to a predetermined mode.

16 Claims, 15 Drawing Sheets

GEAR SHIFT FOR AUTOMOTIVE TRANSMISSION

CROSS-REFERENCE TO RELATED APPLICATION

This application claims priority from Korean Patent Application No. 10-2018-0108243 filed on Sep. 11, 2018, the disclosure of which is incorporated herein by reference in its entirety.

BACKGROUND

1. Technical Field

The present disclosure relates to a transmission system for vehicles, and more particularly, to a gear shift that allows for shift operation.

2. Description of the Related Art

A gear shift is used to change the gear ratio to keep the rotational speed of the engine constant based on the speed of the vehicle. The driver operates the gear shift to change the gear ratio of the gear box. The gear shift gives the driver distinctive detent feeling during shifting between the ranges to allow the driver to recognize it.

The shift modes of the transmission systems may be categorized into a manual shift mode in which the driver adjusts the ranges, and an automatic shift mode in which the ranges are automatically adjusted in accordance with the speed when the driver selects the drive mode (D). Along with them, a sports mode type transmission system is being used which is capable of performing manual shifting as well as automatic shifting in a single transmission system. The sports mode type transmission system is equipped with a manual gear shift as well as an automatic gear shift to allow the vehicle to be normally driven in the automatic shifting mode, and to allow the driver to perform manual shifting by shifting up and down the gear shift.

A gear shift having a knob disposed at one end thereof is exposed to the inside of the vehicle to allow a driver to perform shifting operation. A floor-type gear shift that is installed between the center fascia and the console box of a vehicle is commonly used. The floor-type gear shift, however, makes it more difficult for passengers to move within the interior of the vehicle, and the space inside the vehicle is prevented from being efficiently utilized. Accordingly, it is less desirable for recreational vehicles (RVs).

Therefore, a column-type gear shift has been recently developed, which is installed at the column of the steering wheel instead of the floor between a driver's seat and a front passenger seat. The column-type gear shift liberates valuable interior space of the vehicle and allows for efficient space utilization of the vehicle.

When a vehicle is turned off at a mode other than the park (P)-mode, the driver is required to change the gear shift to the P-mode for subsequent driving, which is inconvenient. Accordingly, gear shifts provide a function of automatically returning to the P-mode when the vehicle is turned off at a mode other than the P-mode. In doing so, the feeling generated when the gear shift is automatically returned to the P-mode causes unnecessary noise and/or abrasion.

Since a column-type gear shift is installed at a narrower space than a floor-type gear shift, the components for shifting and returning are required to be installed in a limited space. Under the circumstances, it is required to avoid unnecessary operational feeling from occurring when the gear shift is returned to the P-mode, and to reduce the installation space for components for shifting and returning, which is as small as that of the column-type gear shift.

SUMMARY

Aspects of the present disclosure provide a gear shift for vehicles that avoids unnecessary feeling when the knob is moved to a predetermined mode when a vehicle is turned off. Aspects of the present disclosure also provide a gear shift for vehicles that avoids unnecessary feeling when the knob is moved to a predetermined mode and occupies a small space. It should be noted that objects of the present disclosure are not limited to the above-mentioned object, and other objects of the present invention will be apparent to those skilled in the art from the following descriptions.

According to an aspect of the present disclosure, a gear shift may include a rotating part coupled with a knob operated by a driver and configured to rotate about a rotation axis to allow one of a plurality of modes of operation to be selected; a contact part disposed at one side of the rotating part to be rotated integrally with the rotating part; a detent mechanism disposed on a rotation path of the contact part to allow an end portion of the contact part to be in contact therewith, providing the driver distinctive detent feeling when the rotating part is rotated; and a moving part configured to move to be disposed between the contact part and the detent mechanism when a moving condition is satisfied, to cause the contact part to be moved from a position that corresponds to one of the plurality of modes to a position that corresponds to a predetermined mode.

Other particulars of the present disclosure will be described in the detailed description with reference to the accompanying drawings.

According to exemplary embodiments of the present disclosure, at least following effects can be achieved:

Distinctive detent feeling may be provided to a driver when the knob is operated by the driver while no feeling is provided when the gear shift is moved to a predetermined mode, and thereby avoiding unnecessary noise or abrasion. In addition, the structure that avoids unnecessary feeling when the knob is moved to a predetermined mode occupies a small space, to allow the overall size to be reduced.

It should be noted that effects of the present disclosure are not limited to the above-described effects, and other effects of the present disclosure will be apparent to those skilled in the art from the following descriptions.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
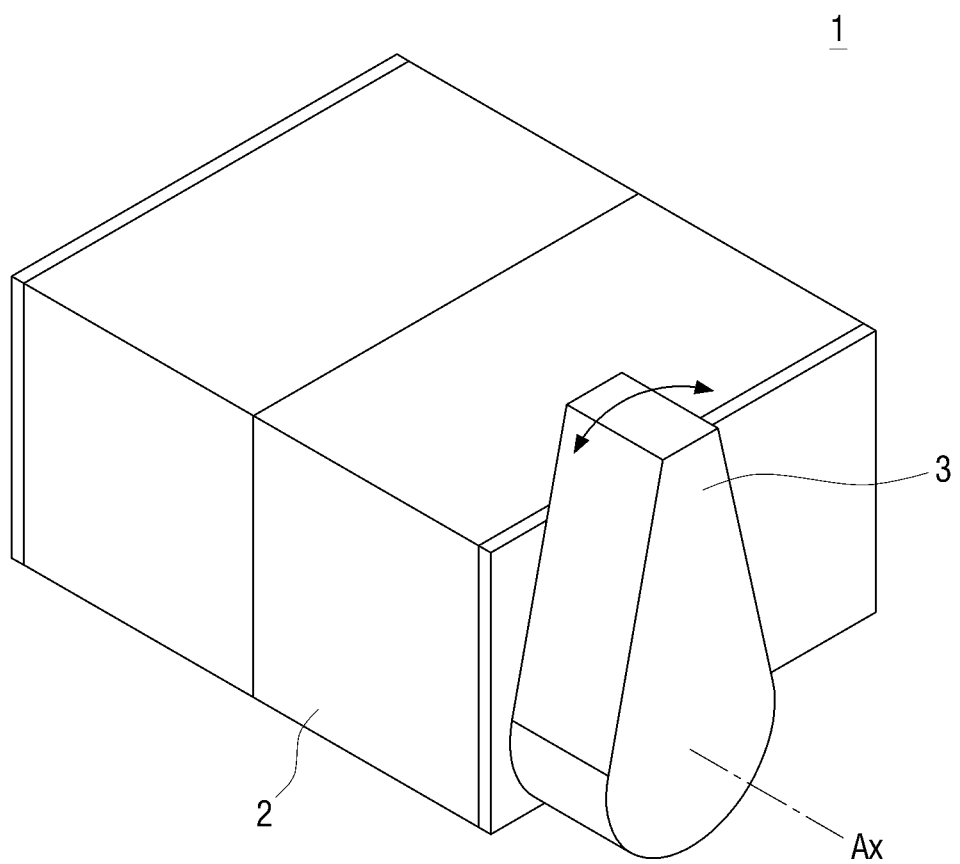
FIG. 1 is a perspective view showing an exterior of a gear shift for vehicles according to an exemplary embodiment of the present disclosure.

Advantages and features of the present disclosure and methods to achieve them will become apparent from the descriptions of exemplary embodiments hereinbelow with reference to the accompanying drawings. However, the present invention is not limited to exemplary embodiments disclosed herein but may be implemented in various different ways. The exemplary embodiments are provided for making the present disclosure thorough and for fully conveying the scope of the present disclosure to those skilled in the art. It is to be noted that the scope of the present disclosure is defined only by the claims. Like reference numerals denote like elements throughout the descriptions. In some exemplary embodiment, the processing steps, the structures and techniques well known in the art are not described in detail in order not to obscure the gist of the present disclosure.

Terms used herein are for illustrating the exemplary embodiments rather than limiting the present disclosure. As used herein, the singular forms are intended to include plural forms as well, unless the context clearly indicates otherwise. As used herein, the terms "comprise" and variations such as "comprises" or "comprising," will be understood to imply the inclusion of stated constituents, steps, operations and/or elements but not the exclusion of any other constituents, steps, operations and/or elements. The term "and/or" used herein includes any and all combinations of one or more of the associated listed items.

Exemplary embodiments of the subject matter are described herein with reference to plan and perspective illustrations that are schematic illustrations of exemplary embodiments of the subject matter. As such, variations from the shapes of the illustrations as a result, for example, of manufacturing techniques and/or tolerances, are to be expected. Therefore, the exemplary embodiments of the present disclosure are not limited to specific features but may include variations depending on the manufacturing processes. The figures are not necessarily drawn to scale, and in some instances the drawings have been exaggerated and/or simplified in places for illustrative purposes only. Like reference numerals denote like elements throughout the descriptions.

Hereinafter, gear shifts according to exemplary embodiments of the present disclosure will be described in detail with reference to the accompanying drawings.

FIG. 1 is a perspective view showing an exterior of a gear shift for vehicles according to an exemplary embodiment of the present disclosure. Referring to FIG. 1, in a gear shift according to the exemplary embodiment of the present disclosure, a knob 3 may be rotatably disposed on one side of a housing 2, to allow a driver to select one of the modes by rotating the knob 3 about the rotation axis Ax. According to the exemplary embodiment of the present disclosure, the modes that can be selected by rotating the knob 3 may include P (parking), R (reverse), N (neutral) and D (drive) modes. It is, however, to be understood that the modes may be modified in a variety of ways. Some of the modes may be selected by operating a separate button or switch.

In the following description, the gear shift 1 according to the exemplary embodiment of the present disclosure may be of a column-type that is installed at the column of the steering wheel of a vehicle, which may liberate the space in the interior of the vehicle. In such case, the housing 2 may be accommodated in the column, and the knob 3 may be exposed outside of the column to allow the driver to operate it. Although the column-type gear shift 1 is described as an example, it is to be understood that the present disclosure may be similarly applied to a floor-type gear shift installed between the center fascia and the console box of a vehicle.

Figure 2:
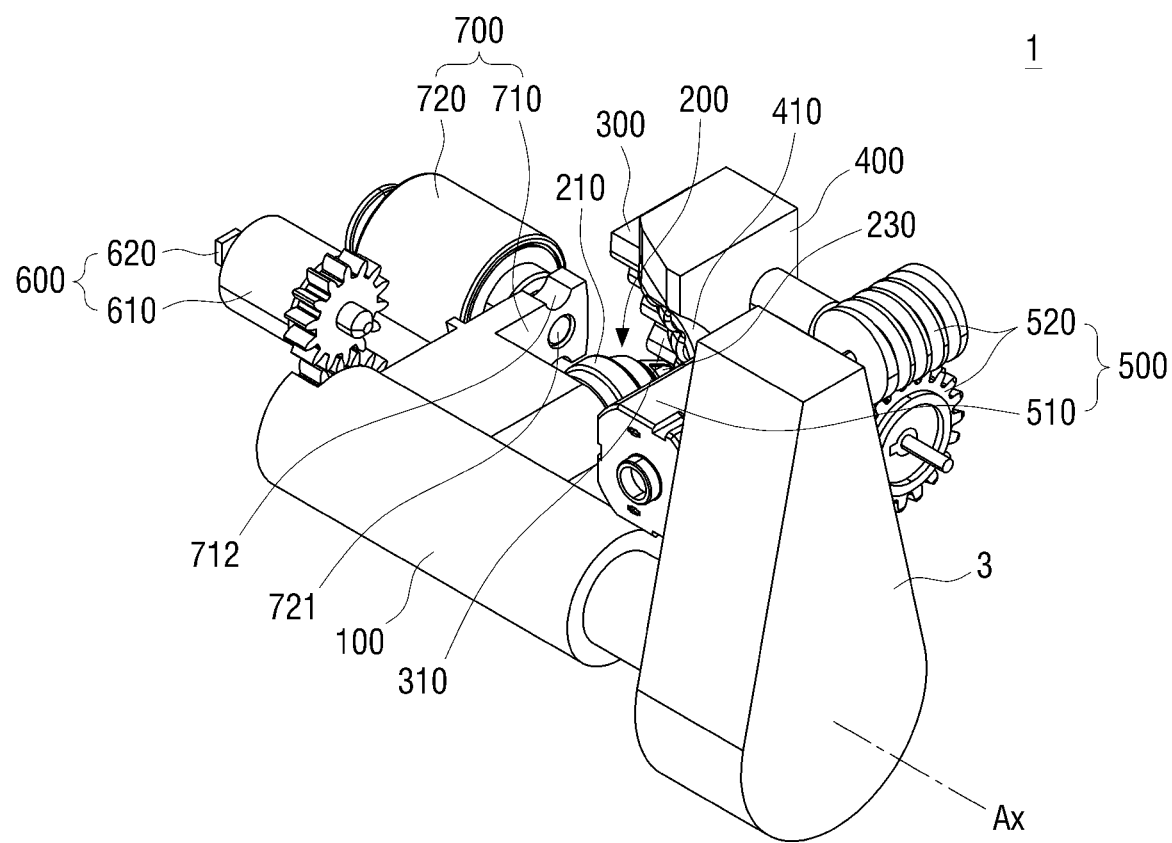
FIGS. 2 and 3 are perspective views showing a gear shift for vehicles according to an exemplary embodiment of the present disclosure.
Figure 3:
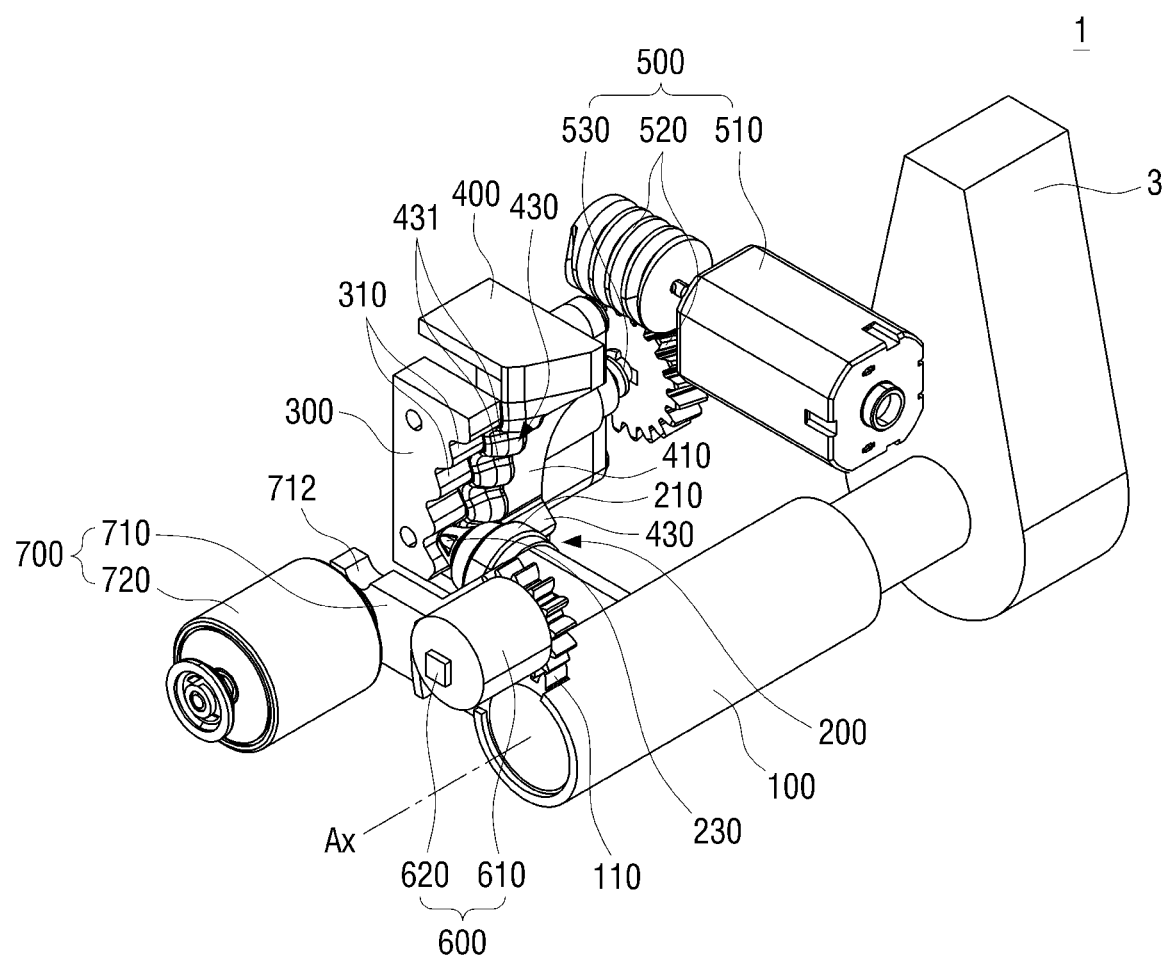
Figure 4:
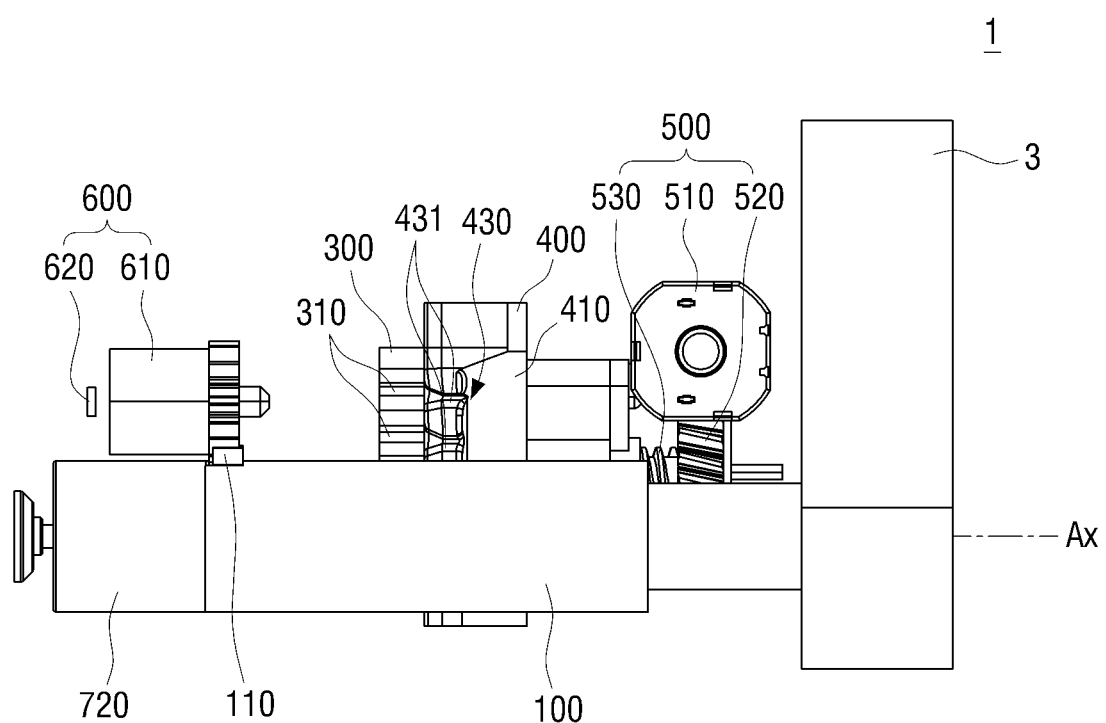
FIG. 4 is a front view of the gear shift according to the exemplary embodiment of the present disclosure.
Figure 5:
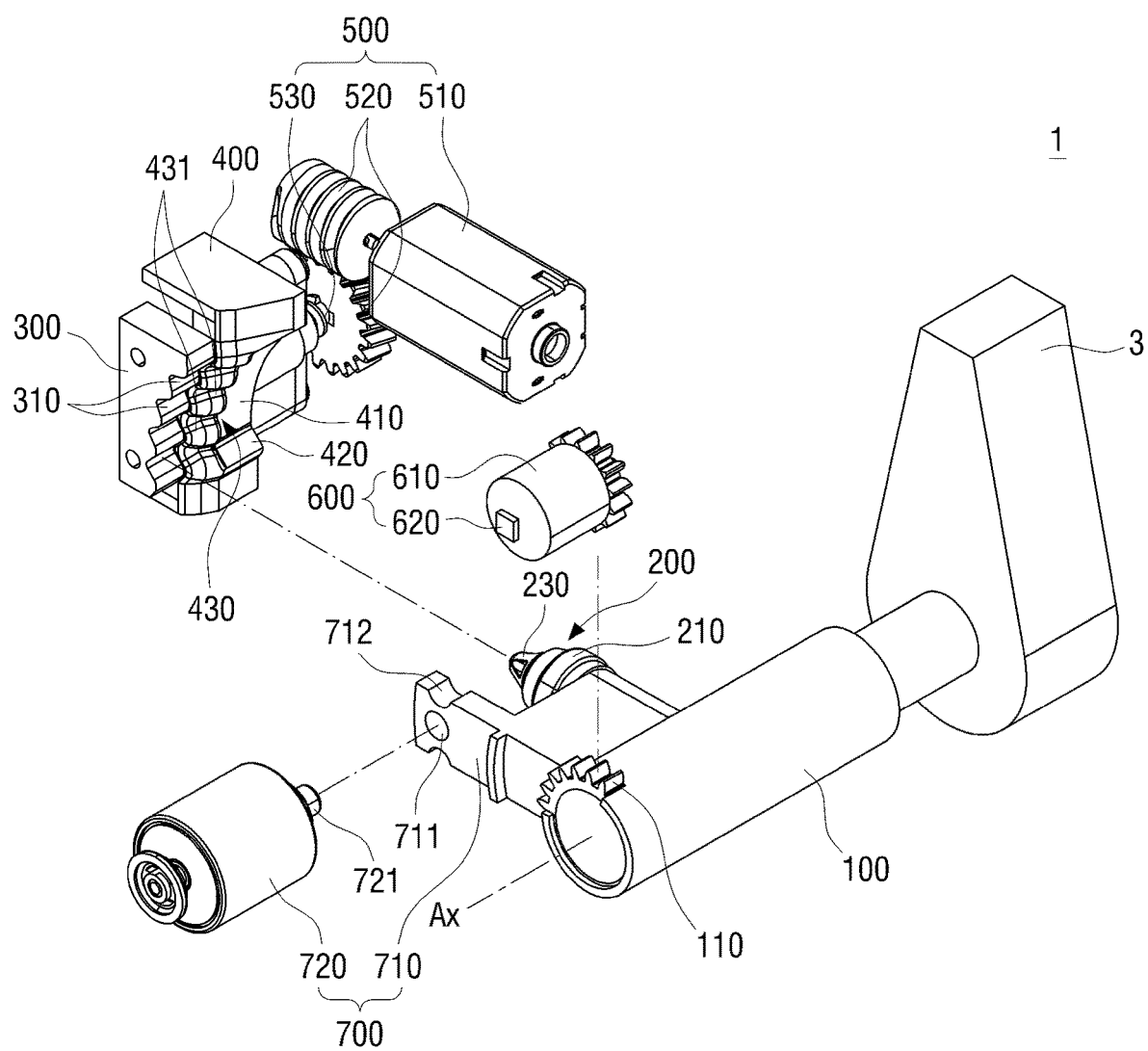
FIG. 5 is an exploded, perspective view of the gear shift according to the exemplary embodiment of the present disclosure.

FIGS. 2 and 3 are perspective views showing a gear shift for vehicles according to an exemplary embodiment of the present disclosure. FIG. 4 is a front view of the gear shift according to the exemplary embodiment of the present disclosure. FIG. 5 is an exploded, perspective view of the gear shift according to the exemplary embodiment of the present disclosure. FIGS. 2 to 5 show an example where the housing 2 of FIG. 1 is omitted. Referring to FIGS. 2 to 5, the gear shift 1 according to the exemplary embodiment of the present disclosure may include a rotating part 100, a contact part 200, a detent mechanism 300, a moving part 400, and a driving mechanism 500.

The rotating part 100 may be coupled with the knob 3 and rotate integrally with the knob 3 about the rotation axis Ax of the knob 3, to allow the driver to select one of the modes. The rotating part 100 that rotates integrally with the knob 3 may be manufactured integrally with the knob 3 or may be manufactured separately and subsequently coupled with each other, to prevent them from moving independently. A sensing part 600 may be disposed at the end of the rotating part 100 to detect the position of the rotating part 100 for determining the mode selected by the knob 3.

A transfer gear 110 for transferring the rotational power (e.g., torque) of the rotating part 100 to the sensing part 600 may be disposed at the end of the rotating part 100. The sensing part 600 may include a magnet gear 610 engaged with the transfer gear 100 and a sensor 620 for detecting a change in a magnetic force depending on the position of the magnet gear 610. Specifically, when the knob 3 is rotated by the driver, the rotating part 100 may rotate about the rotation axis Ax of the knob 3, and the rotation force of the rotating part 100 may be transmitted to the magnet gear 610 through the transfer gear 110. The sensor 620 may be implemented as a Hall sensor or the like and capable of detecting the position of the rotating part 100 by sensing a change in magnetic force as the magnet gear 610 rotates.

Figure 6:
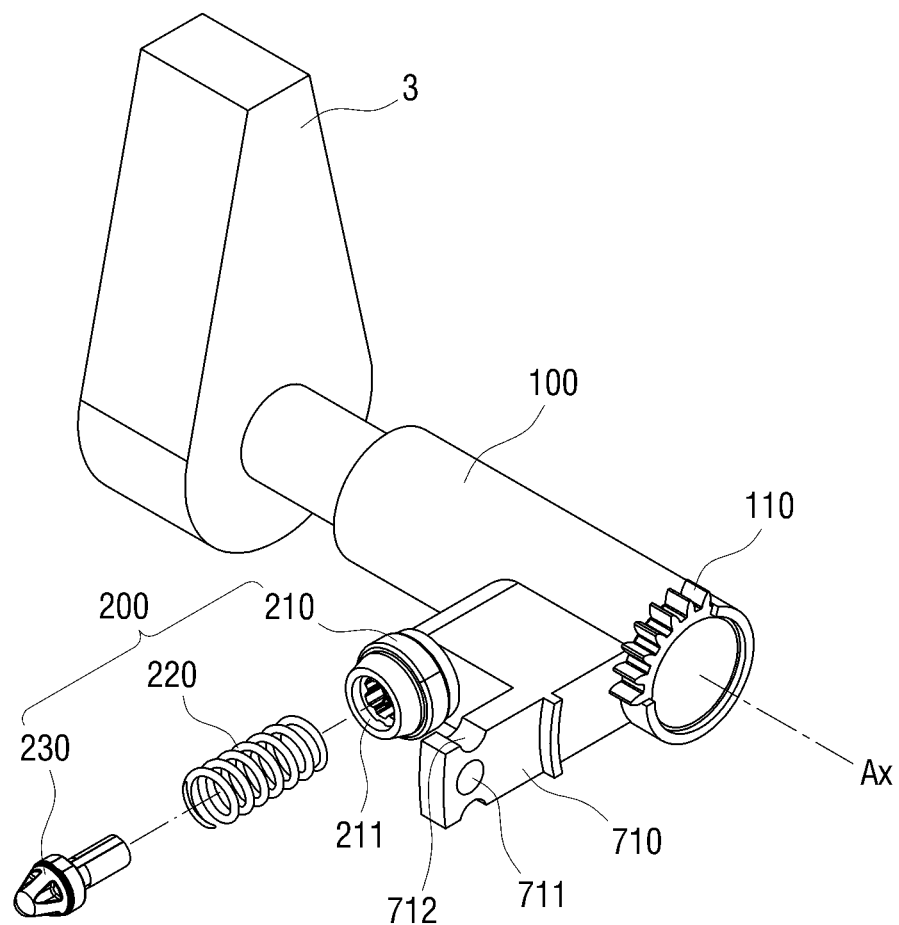
FIG. 6 is an exploded, perspective view of a contact part according to an exemplary embodiment of the present disclosure.

The contact part 200 may be integrally rotated with the rotating part 100. The end of the contact part 200 may be disposed to abut the detent mechanism 300, to give the driver distinctive detent feeling (e.g., tactile feedback) when the rotating part 100 is rotated. As shown in FIG. 6, the contact part 200 may include a receiving portion 210 that extends from the rotating part 100 in a direction perpendicular to the rotation axis Ax of the knob 3, an elastic support 220 inserted into the receiving portion 210, and a bullet 230 which is configured to move in the direction perpendicular to the rotation axis Ax of the knob 3 as the elastic support 220 is compressed or relaxed.

The receiving portion 210 may include a receiving groove 211 formed along the direction in which the receiving portion 210 is extended. The bullet 230 may be disposed to be elastically supported by the elastic support 220 inserted into the receiving groove 211. According to the exemplary embodiment of the present disclosure, a coil spring which is compressed or relaxed in the direction perpendicular to the rotation axis Ax of the knob 3 may be used as the elastic support 220. It is, however, to be understood that the present disclosure is not limited thereto. Any of a variety of springs may be employed as the elastic support 220 as long as it can be elastically deformed by an external force.

The tip of the bullet 230 may be elastically supported by the elastic support 220 to allow the contact position with the detent mechanism 300 to be changed while maintaining a contact with the detent mechanism 300 when the rotating part 100 is rotated. This allows the tip of the bullet 230 to move along the detent mechanism 300 while maintaining the contact with the detent mechanism 300 when the rotating part 100 rotates. Accordingly, the bullet 230 may be moved in the direction perpendicular to the rotation axis Ax of the knob 3 along the shape of the surface of the detent mechanism 300 where the tip of the bullet 230 is in contact, thereby providing the driver distinctive detent feeling.

The detent mechanism 300 may include a plurality of detent grooves 310 formed along the rotation path of the contact part 200. The plurality of detent grooves 310 may be formed at positions corresponding to the modes, respectively, that can be selected by rotating the knob 3. The tip of the bullet 230 may be inserted into one of the detent grooves 310 depending on the rotation direction and the rotation angle of the rotating part 100, or the like. When a force larger than the restoring force of the elastic support 220 is applied to the knob 3 by the driver, the elastic support 220 is compressed, to allow the bullet 230 to be moved from the current detent groove to another detent groove. This may prevent inadvertent operation by the driver.

According to the exemplary embodiment of the present disclosure, the P, R, N and D-modes may be selected by rotating the knob 3, and thus the detent grooves may be formed at the positions that correspond to the P, R, N and D-modes, respectively. In addition, according to the exemplary embodiment of the present disclosure, the modes are selected in the order of the P, R, N and D-modes or the reverse order thereof by rotating the knob 3 by way of example, but the present disclosure is not limited thereto. The order in which the modes are selected may vary depending on the selectable modes.

Figure 7:
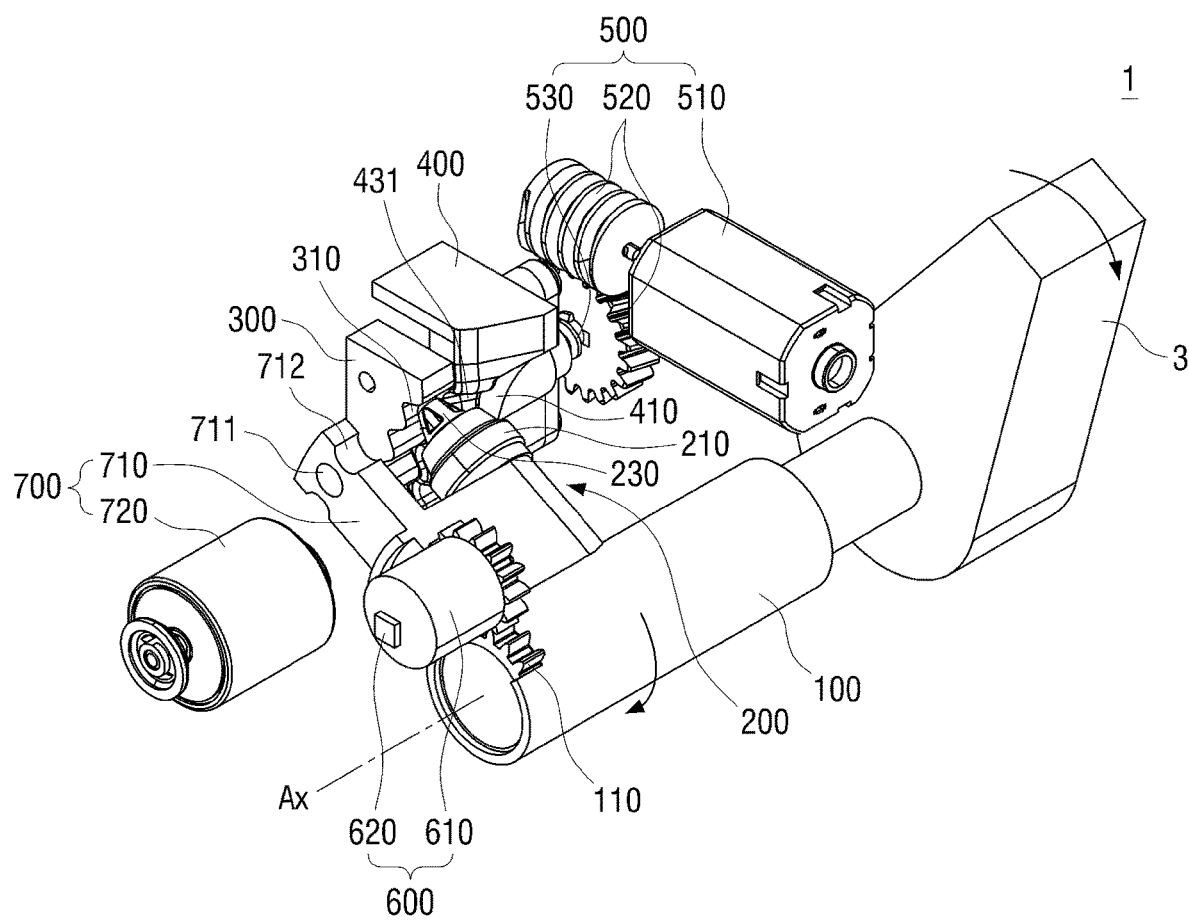
FIG. 7 is a perspective view showing the position of a contact part when a D-mode is selected according to an exemplary embodiment of the present disclosure.
Figure 8:
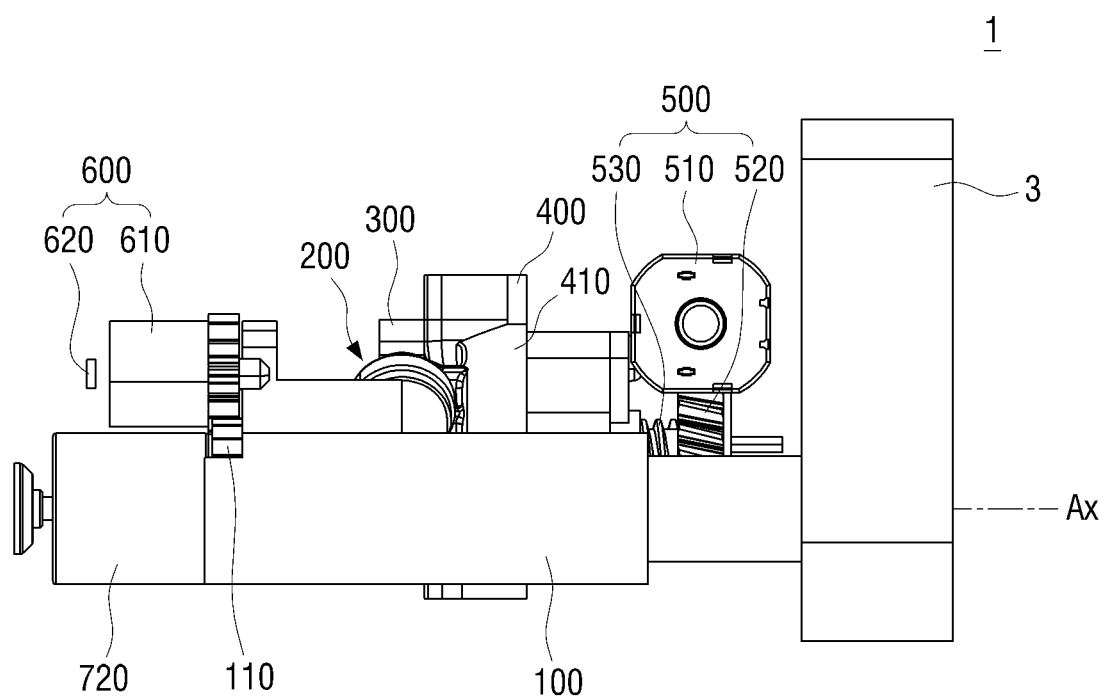
FIG. 8 is a front view showing the position of a contact part when a D-mode is selected according to an exemplary embodiment of the present disclosure.

FIGS. 2 to 4 show an example where the tip of the bullet 230 is positioned at one of the detent grooves that corresponds to the P-mode formed at the end of the detent mechanism 300 in the rotation direction of the contact part 200. When the driver rotates the knob 3 to select the D-mode, the tip of the bullet 230 is positioned at the detent groove that corresponds to the D-mode formed at another end of the detent mechanism 300 in the rotation direction of the contact part 200, as shown in FIGS. 7 and 8. The rotating part 100 may be restricted or released by rotating a lock mechanism 700. Specifically, the rotating part 100 may be allowed to rotate when the shifting conditions for the modes are satisfied, such as the vehicle speed, the operation of the brake pedal. The rotating part 100 may be restricted when the shifting conditions are not satisfied. The shifting conditions for the modes may be the same or different from one another.

The locking mechanism 700 may include a fixing portion 710 that rotates integrally with the rotation part 100 and a restricting portion 720 that restricts the rotation of the fixing portion 710. The fixing portion 710 may include a fixing aperture 711 and a fixing groove 712. The restricting portion 720 may include a fixing rod 721 that may be inserted into the fixing aperture 711 or the fixing groove 712 or may move in the direction of the rotation axis Ax of the knob 3 to be withdrawn from the fixing aperture 711 or the fixing groove 712 based on the mode selected by rotating the knob 3.

According to the exemplary embodiment of the present disclosure, the fixing portion 710 includes the fixing aperture 711 as well as the fixing groove 712. It is, however, to be understood that the present disclosure is not limited thereto. The fixing portion 710 may include at least one of the fixing aperture 711 and the fixing groove 712, and the number and position thereof may be altered as desired according to the modes that restrict the rotation depending on the shifting conditions. In addition, according to the exemplary embodiment of the present disclosure, a solenoid in which the fixing rod 721 is moved in the direction along the rotation axis Ax of the knob 3 is employed as the restricting portion 720, the present disclosure is not limited thereto. Any of a variety of types of actuators may be employed as long as it can be inserted into or released from the above-described fixing aperture 711 and fixing groove 712.

Referring back to FIGS. 1 to 5, the moving part 400 according to the exemplary embodiment of the present disclosure may be movable along the direction of the rotation axis Ax of the knob 3, to allow the knob 3 to move to a predetermined mode if the moving conditions are satisfied. According to the exemplary embodiment of the present disclosure, the moving conditions are satisfied, and the moving part 400 is moved to the P-mode, when a vehicle is turned off at a mode other than the P-mode, e.g., R, N or D-mode. It is, however, to be understood that the present disclosure is not limited thereto. The moving part 400 may allow the knob 3 to be moved to a predetermined mode pursuant to a separate command.

When the knob 3 is moved to the predetermined mode position, only the position of the knob 3 may be changed while maintaining the previous mode, i.e., one of the P, R, N and D modes. When the knob 3 is rotated by the driver, the moving part 400 may allow the detent mechanism 300 to be disposed on the rotation path of the contact part 200 in order to provide the driver distinctive detent feeling. When the moving conditions are satisfied, the moving part 400 may be moved in the direction of the rotation axis Ax to be disposed between the contact part 200 and the detent mechanism 300, to allow the knob 3 to be moved to the predetermined mode position.

In the following description, the position of the moving part 400 when the detent mechanism 300 is positioned on the rotation path of the contact part 200 is referred to as a first position, while the position of the moving part 400 when it is disposed between the contact part 200 and the detent mechanism 300 is referred to as a second position. The first position and the second position may be different in the direction of the rotation axis Ax of the knob 3 as the moving part 400 moves in the direction of the rotation axis Ax of the knob 3. The moving part 400 may be moved to be disposed between the contact part 200 and the detent mechanism 300 to allow the knob 3 to be moved to the predetermined mode position in order to avoid unnecessary detent feeling or abrasion when no shifting is required, e.g., when the vehicle is turned off. In addition, the moving part 400 may be moved to be disposed between the contact part 200 and the detent mechanism 300 pursuant to a separate command to move the knob 3 to the predetermined mode position, as well as when the vehicle is turned off to avoid unnecessary detent feeling.

When the moving condition is satisfied, the moving part 400 may move in the direction of the rotation axis Ax of the knob 3 to allow the moving part 400 to be moved from the first position to the second position. Subsequently, the moving part 400 may be positioned between the contact part 200 and the detent mechanism 300. The moving part 400 may include a contact surface 410 that abuts the end of the contact part 200 when it is moved from the first position to the second position. Specifically, the positions of the contact portion 200 and the detent mechanism 300 may be stationary while the moving part 400 moves to be disposed between the contact part 200 and the detent mechanism 300, to allow the contact position of the contact part 200 to be moved from the detent mechanism 300 to the contact surface 410.

The contact surface 410 may have a shape that slopes away from the rotation axis Ax of the knob 3 as the contact part 200 is rotated in the direction closer to the P-mode in the order of the modes that are selected by the rotation of the knob 3. Specifically, according to the exemplary embodiment of the present disclosure where the modes are selected in the order of the P, R, N and D-modes or in the reverse order thereof by rotating the knob 3, the position of the contact surface 410 in contact with the end of the contact part 200 may be the farthest from the rotation axis Ax of the knob 3 at the P-mode and may be the closest to the rotation axis Ax of the knob 3 at the D-mode.

According to the exemplary embodiment of the present disclosure, the contact surface 410 may be formed in the vertical direction. The position that corresponds to the P-mode may be lower than the positions that correspond to the modes other than the P-mode to allow the contact part 200 to be moved to the position that corresponds to the P-mode by the weight of the contact part 200 due to gravity. In other words, the contact surface 410 may be formed such that it becomes closer to the rotation axis Ax of the knob 3 going from the lower end that corresponds to the P-mode to the upper end.

Accordingly, the contact surface 410 may be formed in the vertical direction and may have the shape that is farthest from the rotation axis Ax of the knob 3 at the P-mode and is closest to the rotation axis Ax of the knob 3 going from the lower end that corresponds to the P-mode to the upper end, so that when a vehicle is turned off at a mode other than the P-mode, the contact surface 200 can be moved to the position that corresponds to the P-mode by the weight of the contact surface 200 in the gravity direction. In other words, as the contact surface 410 has the shape that slopes away from the rotation axis Ax of the knob 3 toward the position that corresponds to the P-mode, the weight 230 of the contact part 200 itself as well as the restoring force of the elastic support 220 that elastically supports the contact part 200 may allow the contact part 200 to be moved to the position that corresponds to the P-mode and out of the mode other than the P-mode.

According to the exemplary embodiment of the present disclosure, the contact surface 410 may have a curved shape having a predetermined curvature, but the present disclosure is not limited thereto. The contact surface 410 may also have a planar surface, a curved surface, or a combination thereof as long as the contact part 200 can be moved back to the P-mode position by the weight of the contact part 200 and the restoring force of the elastic support 220.

As described above, since the contact surface 410 has the shape that becomes farther from the rotation axis Ax of the knob 3 toward the P-mode position, the contact surface 200 may be moved to a predetermined position, i.e., the P-mode position by the weight of the contact surface 200 without any additional driving force, and thus the knob 3 may be moved to the predetermined mode position, i.e., the P-mode position.

If the contact surface 410 has a shape that becomes closer to the rotation axis Ax of the knob 3 toward the position that corresponds to the P-mode position, the elastic support 220 is required to be compressed in order for the contact part 200 to move to the P-mode position. Accordingly, the restoring force of the elastic support 220 may increase, and the frictional force between the contact part 200 and the contact surface 410 may increase. As a result, it is more difficult for the contact part 200 to move to the P-mode position by its own weight.

Figure 12:
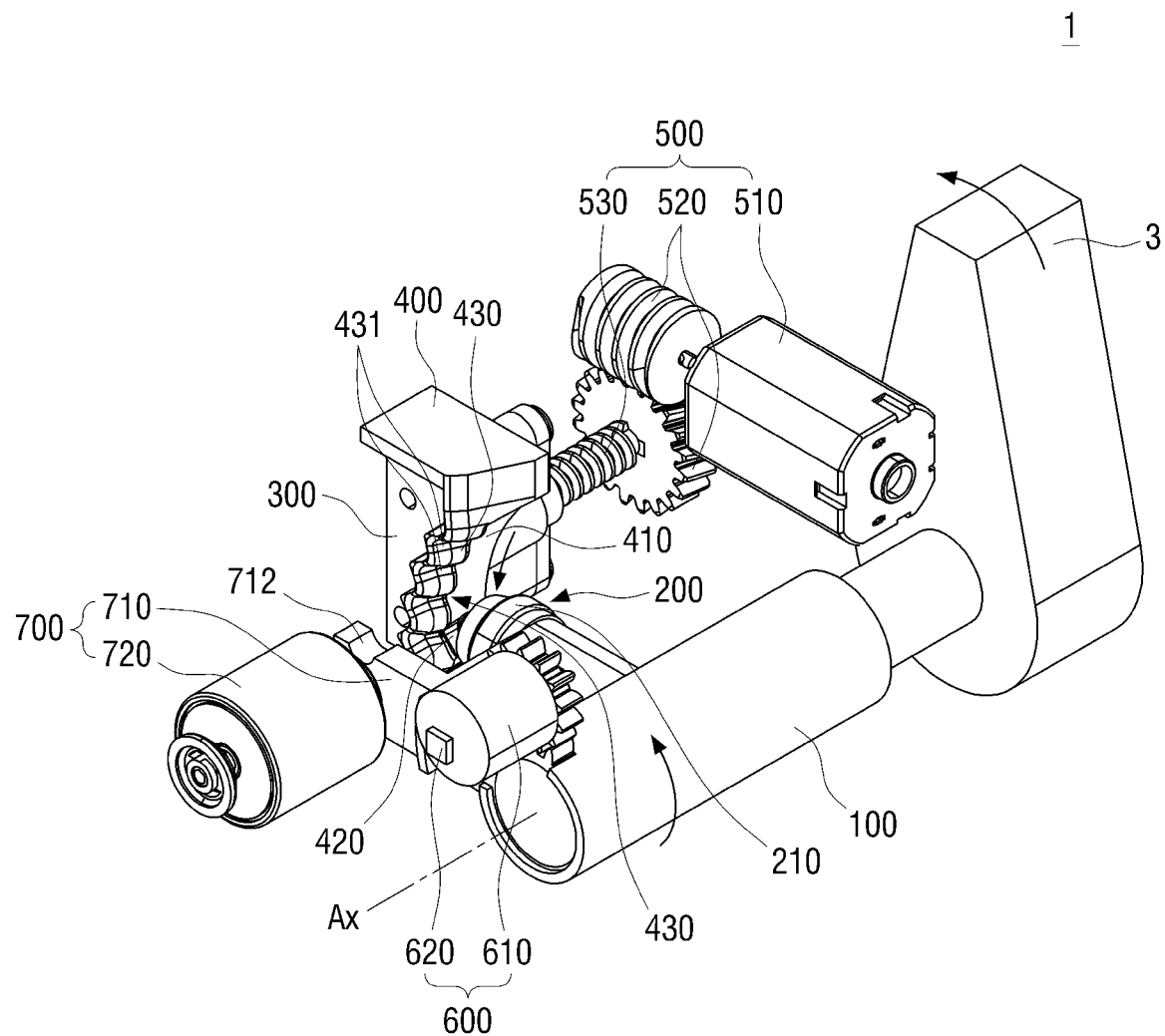
FIG. 12 is a perspective view showing a knob moved to a predetermined mode position by a moving part according to an exemplary embodiment of the present disclosure.
Figure 13:
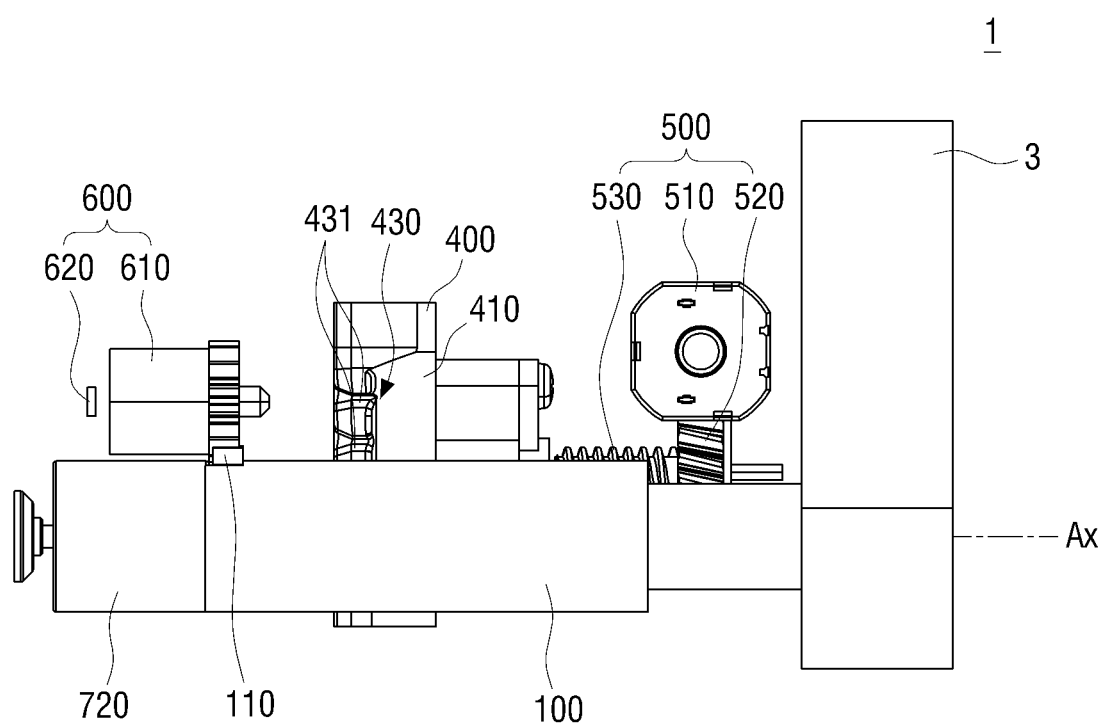
FIG. 13 is a front view showing a knob moved to a predetermined mode position by a moving part according to an exemplary embodiment of the present disclosure.

In view of the above, according to the exemplary embodiment of the present disclosure, the contact surface 410 may have the shape that slopes away from the rotation axis Ax of the knob 3 toward the position that corresponds to the P-mode, and the weight of the contact part 200 itself and the restoring force of the elastic support 220 may allow the contact part 200 to be moved to the predetermined position along the contact surface 410, to allow the knob 3 to be moved to the predetermined mode position, as shown in FIGS. 12 and 13.

A stopper 420 may be formed at one end of the contact surface 410 in the rotation direction of the contact portion 200 to restrict the movement of the contact part 200 to the predetermined position by the contact surface 410. Therefore, when the contact part 200 is moved along the contact surface 410, it can be restricted from moving beyond the position where the stopper 420 is formed, i.e., the position that corresponds to the P-mode. According to the exemplary embodiment of the present disclosure, the stopper 420 may be formed at the position of the contact surface 410 that corresponds to the P-mode. It is, however, to be understood that the present disclosure is not limited thereto. The stopper 420 may be formed at at least one of both ends of the contact surface 410.

According to the exemplary embodiment of the present disclosure, the contact part 200 may be moved to the position that corresponds to the P-mode by the weight of the contact part 200 and the restoring force of the elastic support 220. It is, however, to be understood that the present disclosure is not limited thereto. The contact surface 410 may have a shape that the distance between the contact surface 410 and the rotation axis Ax makes the force acting in the gravity direction by the weight of the contact part 200 is greater than the friction force between the contact part 200 and the contact surface 410.

According to the above-described exemplary embodiment, the position that corresponds to the P-mode may be the lower end of the contact surface 410 while the positions that correspond to other modes may be disposed above the position that corresponds to the P-mode to allow the knob 3 to be moved to the P-mode when the moving conditions are satisfied. It is, however, to be understood that the present disclosure is not limited thereto. The contact surface 410 may be formed such that a mode to which the knob 3 is moved may be disposed lower than the other modes when the moving conditions are satisfied.

According to the exemplary embodiment of the present disclosure, in the column-type gear shift for vehicles, when the contact part 200, specifically, the bullet 230 is moved in the vertical direction, the contact part 200 may be moved to the position that corresponds to a predetermined mode by its own weight. It is, however, to be understood that the present disclosure can be applied to a variety of types of gear shift such as a column-type gear shift and a floor-type gear shift in which a bullet is moved in the vertical direction, and to a variety of operation modes such as a joystick mode and a rotary type mode.

The driving mechanism 500 may generate a driving force for moving the moving part 400. The driving mechanism 500 may include an actuator 510, a driving gear 520, and a lead screw 530. The actuator 510 may generate a driving force when the moving conditions are satisfied. The lead screw 530 may be rotated by receiving the driving force from the actuator 510 through the driving gear 520. The moving part 400 may have a nut structure in which the moving direction is determined according to the rotating direction of the lead screw 530.

A guide portion 430 may be disposed on one side of the moving part 400, more specifically, at the side that faces the detent mechanism 300 when the moving part 400 is at the first position. The guide portion 430 may move integrally with the moving part 400 when the moving part 400 moves, and may guide the contact part 200 from the detent mechanism 300 to the contact surface 410. The guide portion 430 may include a plurality of guide grooves 431 that correspond to the detent grooves 310, respectively.

The guide portion 430 may have a shape such that the guide grooves 431 conform to the detent grooves 310, respectively, to allow the moving part 400 to be disposed between the contact part 200 and the detent mechanism 300 when the moving part 400 moves from the first position to the second position. When the moving part 400 is disposed at the first position, one side of each of the guide grooves 431 is aligned with the respective one of the detent grooves 310, and the other side thereof is extended toward the contact surface 410, to allow the position of the contact part 200 to be maintained while the moving part 400 moves from the first position to the second position when the vehicle is turned off with the contact part 200 disposed at one of the detent grooves 310.

Figure 9:
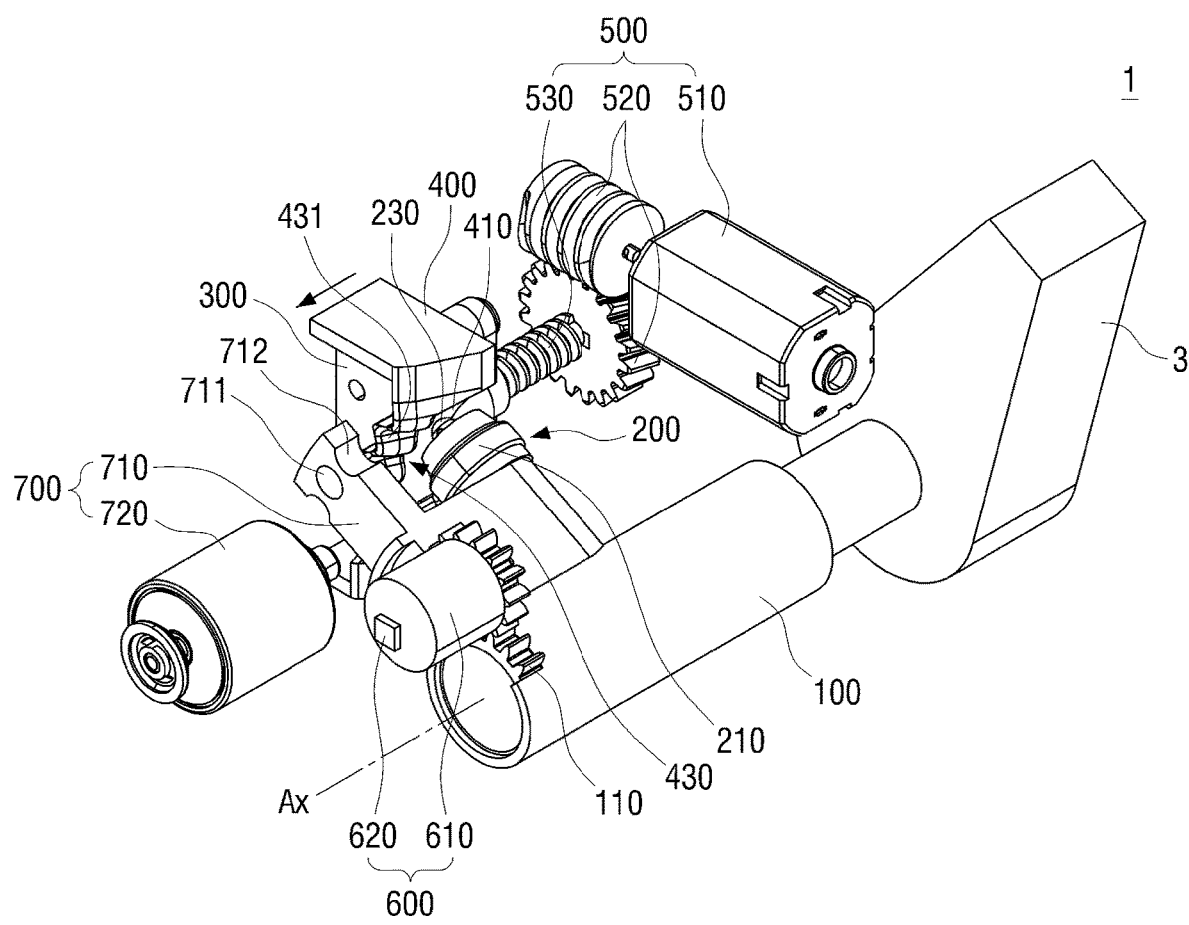
FIGS. 9 and 10 are perspective views showing a moving part when it is moved to a second position from a first position according to an exemplary embodiment of the present disclosure.
Figure 10:
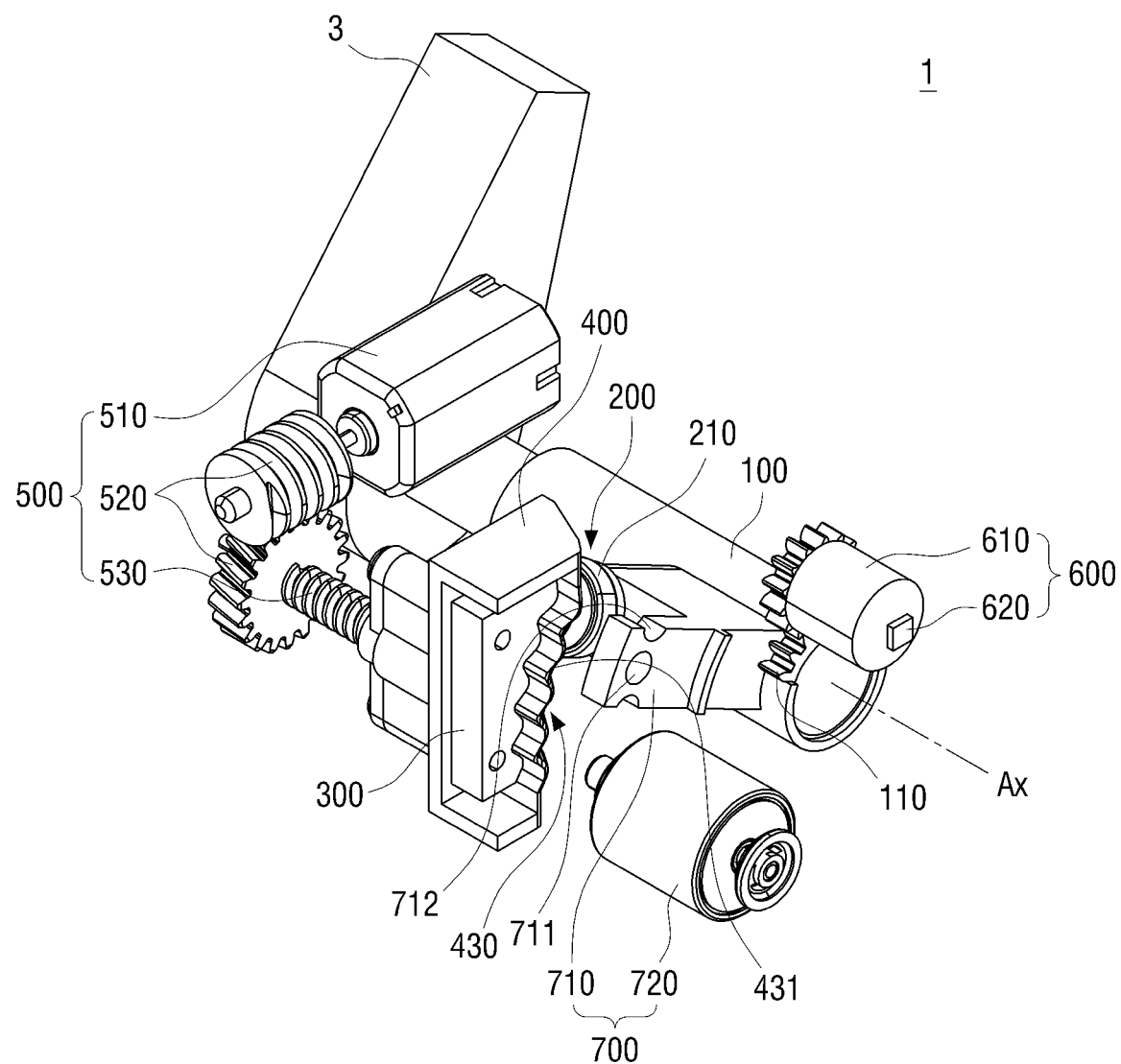
Figure 11:
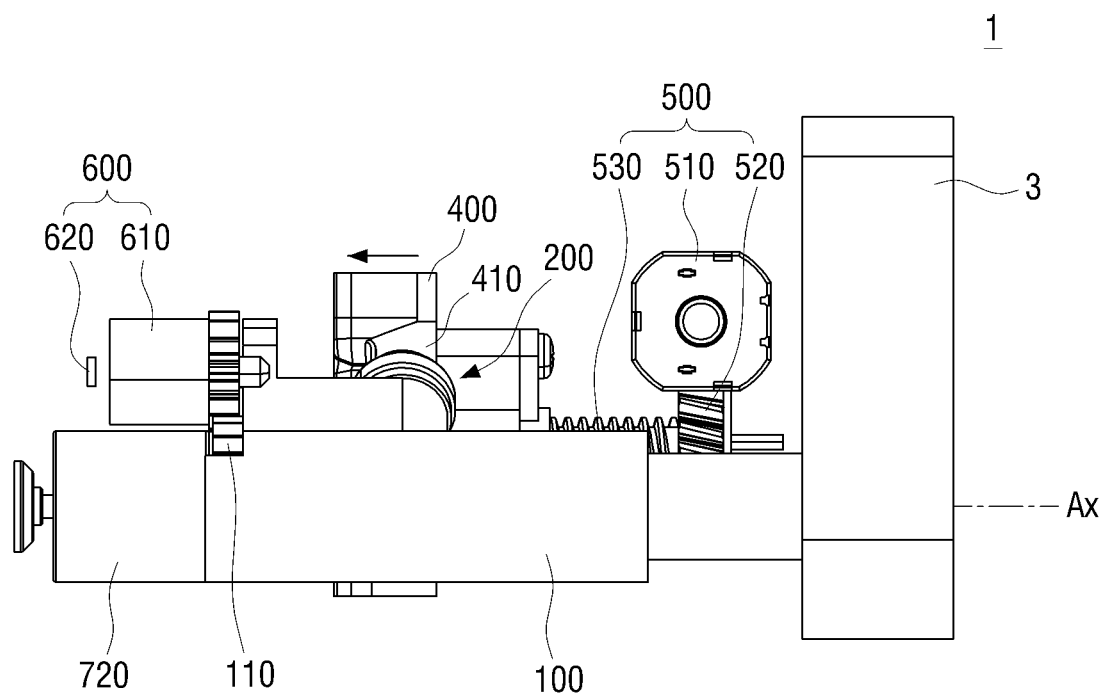
FIG. 11 is a front view showing a moving part when it is moved to a second position from a first position according to an exemplary embodiment of the present disclosure.
Figure 14:
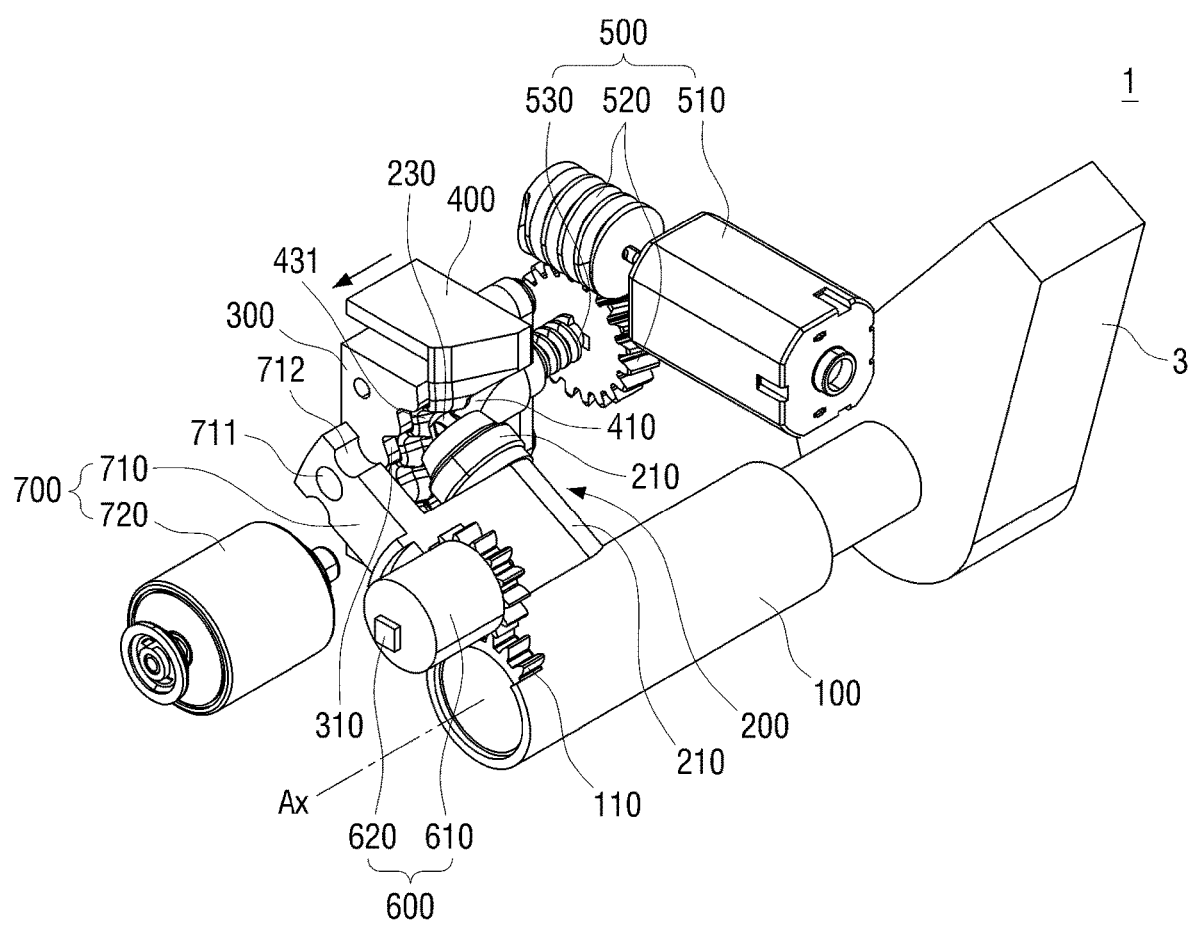
FIG. 14 is a perspective view of a contact part disposed at a guide groove of a guide portion according to an exemplary embodiment of the present disclosure.
Figure 15:
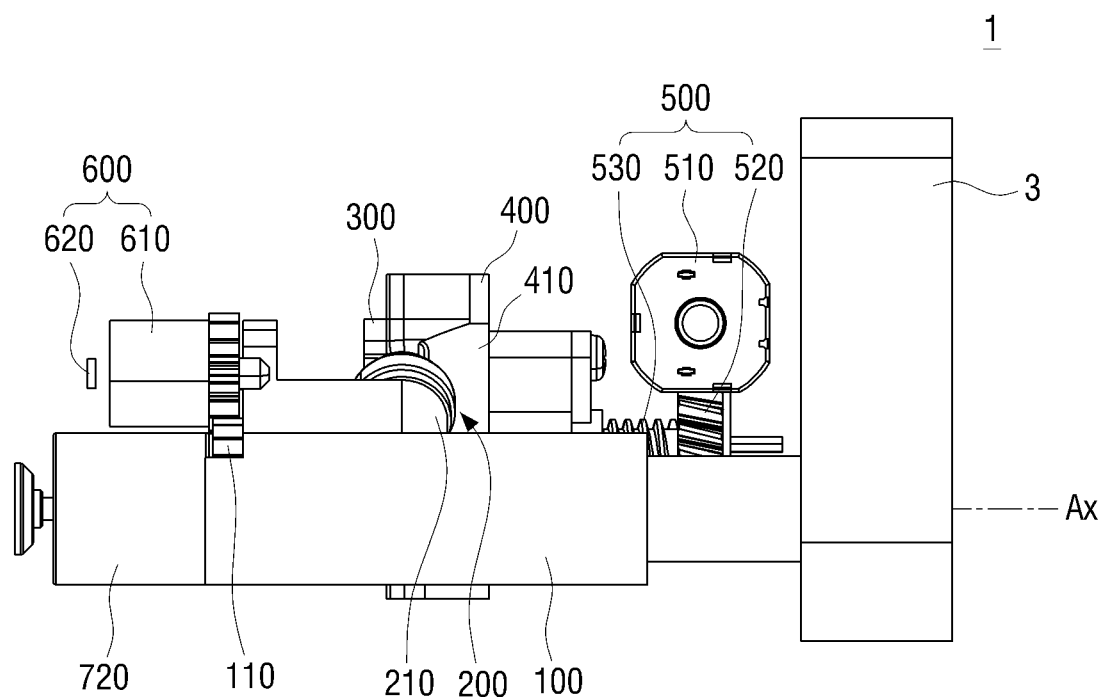
FIG. 15 is a front view of a contact part disposed at a guide groove of a guide portion according to an exemplary embodiment of the present disclosure.

In other words, while the moving part 400 moves from the first position to the second position, the contact part 200 may be guided to the contact surface 410 by the guide groove that corresponds to the detent groove in which it is currently disposed as shown in FIGS. 14 and 15. Accordingly, it is possible to prevent the position of the contact part 200 from being changed until the contact part 200 is moved to the contact surface 410 of the moving part 400 as shown in FIGS. 9 to 11 as described above.

According to the exemplary embodiment of the present disclosure, the position of the contact part 200 may be maintained until the moving part 400 is moved from the first position to the second position by the guide portion 400. It is, however, to be understood that the present disclosure is not limited thereto. When the contact part 200 is moved from the detent mechanism 300 directly to the contact surface 410 of the moving part 400, the guide portion 430 may be eliminated.

As described above, in a vehicle having a relatively small installation space such as a column-type gear shift, when the vehicle is turned off, the gear shift 1 according to the exemplary embodiment of the present disclosure may allow the knob 3 to move to a predetermined mode position without additional parts since it can be moved by its own weight. As a result, a number of parts may be decreased, thereby reducing the overall size, providing a simpler configuration, and saving the cost.

It will be evident to those skilled in the art that various modifications and changes may be made in the exemplary embodiments of the present disclosure without departing from the technical idea or the gist of the present disclosure. Therefore, it should be understood that the above-mentioned embodiments are not limiting but illustrative in all aspects. It should be understood that the drawings and the detailed description are not intended to limit the present disclosure to the particular forms disclosed herein, but on the contrary, the intention is to cover all modifications, equivalents, and alternatives falling within the spirit and scope of the present disclosure as defined by the appended claims.

What is claimed is:

1. A gear shift for vehicles, comprising:
    a rotating part coupled with a knob operated by a driver and configured to rotate about a rotation axis to allow one of a plurality of modes of operation to be selected;
    a contact part disposed at one side of the rotating part to be rotated integrally with the rotating part;
    a detent mechanism disposed on a rotation path of the contact part to allow an end portion of the contact part to be in contact therewith, providing the driver distinctive detent feeling when the rotating part is rotated; and
    a moving part configured to move and to be disposed between the contact part and the detent mechanism when a moving condition is satisfied, to cause the contact part to be moved from a position that corresponds to one of the plurality of modes to a position that corresponds to a predetermined mode.

2. The gear shift of claim 1, wherein the contact part comprises:
    an elastic support; and
    a bullet elastically supported by the elastic support to be movable in a direction perpendicular to the rotation axis to allow a tip thereof to be in contact with the detent mechanism.

3. The gear shift of claim 1, wherein an end of the contact part is configured to move in a direction perpendicular to the rotation axis.

4. The gear shift of claim 1, wherein the moving part is configured to move in a direction along the rotation axis of the rotating part.

5. The gear shift of claim 1, wherein the moving part allows the contact part to move to a position that corresponds to the predetermined mode by its own weight.

6. The gear shift of claim 1, wherein the end portion of the contact part is in contact with a contact surface formed in the moving part when the moving part is disposed between the contact part and the detent mechanism.

7. The gear shift of claim 6, wherein the contact surface is formed in a curved shape having a predetermined curvature.

8. The gear shift of claim 6, wherein the contact surface is formed in a shape that becomes closer to or away from the rotation axis from a first end to a second end along a rotational direction of the contact part.

9. The gear shift of claim 6, wherein the contact surface is formed in a shape that becomes away from the rotation axis toward the position that corresponds to the predetermined mode, and
wherein the position that corresponds to the predetermined mode is disposed lower than positions that correspond to other modes.

10. The gear shift of claim 9, wherein a position of the contact surface that corresponds to a parking mode is disposed below the positions that correspond to the other modes.

11. The gear shift of claim 6, further comprising:
a stopper disposed at at least one end of the contact surface along a rotational direction of the contact part to restrict movement of the contact part.

12. The gear shift of claim 1, further comprising:
a guide portion formed on one side of the moving part and configured to guide the movement of the contact part when the moving part is moved to be disposed between the contact part and the detent mechanism.

13. The gear shift of claim 12, wherein the detent mechanism comprises a plurality of detent grooves formed at positions that correspond to the plurality of modes, respectively, and
wherein the guide portion comprises a plurality of guide grooves that correspond to the plurality of detent grooves, respectively.

14. The gear shift of claim 13, wherein each of the plurality of guide grooves has a shape that conforms to a respective one of the plurality of detent grooves to allow the guide portion to be moved to be disposed between the contact part and the detent mechanism when the moving part moves.

15. The gear shift of claim 13, wherein one side of each of the plurality of guide grooves is aligned with a respective one of the plurality of detent grooves, and the other side of the each of the plurality of guide grooves is extended to the contact surface when the detent mechanism is disposed on a rotation path of the contact part.

16. The gear shift of claim 1, further comprising:
a driving mechanism configured to generate a driving force for moving the moving part,
wherein the driving mechanism comprises:
an actuator;
a lead screw for moving the moving part in a direction along the rotation axis based on a rotational direction of the lead screw; and
a driving gear for transmitting the driving force from the actuator to the lead screw.

* * * * *